Jan. 3, 1928.

A. CORONA

ENGINE

Filed Aug. 24, 1926

1,654,792

WITNESSES

INVENTOR
Arthur Corona
BY
ATTORNEYS

Patented Jan. 3, 1928.

1,654,792

UNITED STATES PATENT OFFICE.

ARTHUR CORONA, OF BROOKLYN, NEW YORK, ASSIGNOR OF ONE-HALF TO NATHAN HIRSCH, OF NEW YORK, N. Y.

ENGINE.

Application filed August 24, 1926. Serial No. 131,253.

This invention relates to engines and more particularly to improved power transmitting mechanism, an object of the invention being to provide an engine with a flywheel containing a countershaft directly geared to the crank shaft of the engine, so that vibration is minimized and other advantages had.

A further object is to provide improvements of this character which can be connected to any engine in ordinary use without altering the engine.

With these and other objects in view, the invention consist in certain novel features of construction and combinations and arrangements of parts, which will be more fully hereinafter described and pointed out in the claim.

In the accompanying drawings—

Figure 1:
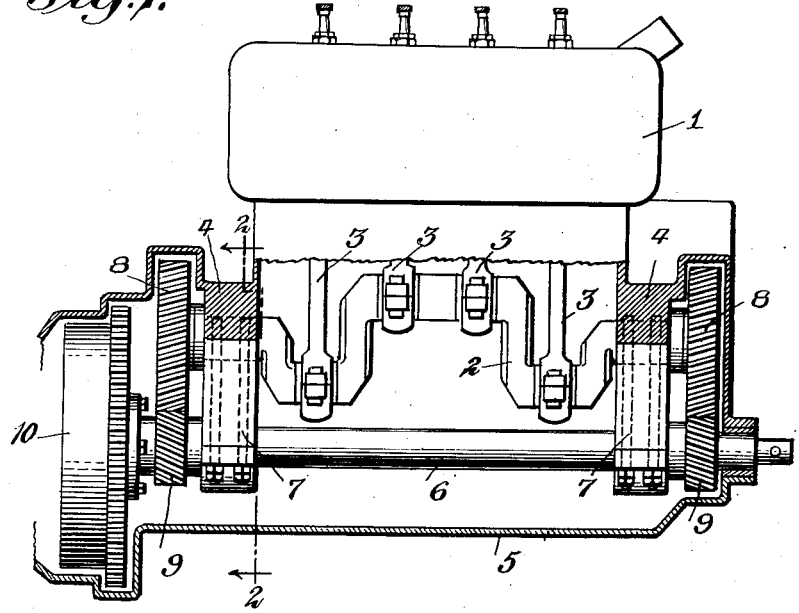
Figure 1 is a view, partly in elevation and partly in section, illustrating my invention as applied to an engine of the four-cylinder type but it is of course to be understood that the invention may be employed with any type of engine.
Figure 2:
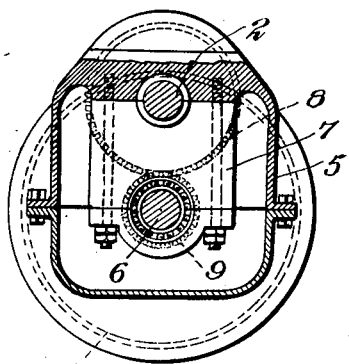
Figure 2 is a view in transverse section on the line 2—2 of Figure 1.

1 represents an engine of the internal combustion type, although it is to be understood that the invention may apply to any type of engine. 2 is the crank shaft which is connected by pitmen or connecting rods 3 with the several pistons (not shown). This shaft 2 is mounted in bearings 4 and turns in a crank case 5. 6 represents my improved countershaft which is supported in bearing blocks 7, the latter being secured to the bearings 4 so as to provide a rigid mounting for the countershaft.

On the crank shaft 2 at both ends thereof gear wheels 8 are secured and mesh with smaller gear wheels 9 on the countershaft 6 so as to drive the latter at an increased speed over that of the crank shaft 2. 10 represents a flywheel which is secured on the countershaft 6 and not on the crank shaft, as is customary in the art.

It is this broad idea of a countershaft carrying a flywheel and geared directly to the crank shaft of an engine which constitutes the broad idea of my invention, and I do not wish to be limited to the specific details of construction but desire to cover broadly the idea as expressed as I am fully convinced that such a construction gives vastly improved results over engines such as ordinarily made.

Various changes and alterations might be made in the general form of the parts described without departing from my invention and hence I do not limit myself to the precise details set forth but consider myself at liberty to make such changes and alterations as fairly fall within the spirit and scope of the appended claim.

I claim:

In combination with an engine having a crank shaft and bearings for the crank shaft, of bearing blocks secured to the last mentioned bearings, a countershaft in said bearing blocks, gears connecting the crank shaft and the countershaft, and a flywheel on the countershaft.

ARTHUR CORONA.